US012579626B2

(12) United States Patent
Harary et al.

(10) Patent No.: US 12,579,626 B2
(45) Date of Patent: Mar. 17, 2026

(54) TEXT-BASED IMAGE ANOMALY DETECTION

(71) Applicant: International Business Machines Corporation, Armonk, NY (US)

(72) Inventors: Sivan Harary, Manof (IL); Assaf Arbelle, Lehvot Haviva (IL); Eliyahu Schwartz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 18/342,017

(22) Filed: Jun. 27, 2023

(65) Prior Publication Data

US 2025/0005727 A1     Jan. 2, 2025

(51) Int. Cl.
| | |
|---|---|
| *G06T 7/00* | (2017.01) |
| *G06F 16/532* | (2019.01) |
| *G06F 16/56* | (2019.01) |

(52) U.S. Cl.
CPC .......... *G06T 7/0002* (2013.01); *G06F 16/532* (2019.01); *G06F 16/56* (2019.01); *G06T 2207/20081* (2013.01)

(58) Field of Classification Search
CPC ......... G06T 7/0002; G06T 2207/20081; G06F 16/532; G06F 16/56
USPC ....................................................... 382/155
See application file for complete search history.

(56) References Cited

U.S. PATENT DOCUMENTS

2022/0222794 A1     7/2022  Lu et al.

FOREIGN PATENT DOCUMENTS

| | | |
|---|---|---|
| CN | 113159071 A | 7/2021 |
| CN | 109271537 B | 11/2021 |

OTHER PUBLICATIONS

Seibold, Constantin, et al. "Breaking with fixed set pathology recognition through report-guided contrastive training." International conference on medical image computing and computer-assisted intervention. Cham: Springer Nature Switzerland, 2022. (Year: 2022).*
Huang, M., Jia, S., Chang, M. C., & Lyu, S. (May 2022). Text-Image De-Contextualization Detection Using Vision-Language Models. In ICASSP 2022-2022 IEEE International Conference on Acoustics, Speech and Signal Processing (ICASSP) (pp. 8967-8971). IEEE.
Sergios Karagiannakos, "Vision Language models: towards multi-modal deep learning," AI Summer, Dated: Mar. 3, 2022, pp. 1-17.

(Continued)

*Primary Examiner* — Jonathan S Lee
(74) *Attorney, Agent, or Firm* — Patterson + Sheridan, LLP

(57)     ABSTRACT

Method and apparatus for image processing. A plurality of positive text exemplars is processed to generate a set of normal features using a trained model. A plurality of negative text exemplars is processed to generate a set of anomaly features using the trained model. A query image depicting an object is received. A query image feature for the query image is generated using the trained model. An anomaly score for the query image is generated based at least in part on determining one or more distances between the query image feature and one or more normal features of the set of normal features, and determining one or more distances between the query image feature and one or more anomaly features of the set of anomaly features.

14 Claims, 9 Drawing Sheets

(56) References Cited

OTHER PUBLICATIONS

Aodong Li et al., "Zero-Shot Anomaly Detection without Foundation Models," arXiv.org, Dated: Feb. 15, 2023, pp. 1-15.

Hannah M. Schlüter et al., "Natural Synthetic Anomalies for Self-Supervised Anomaly Detection and Localization," arXiv.org, Dated: Jul. 24, 2022, pp. 1-22.

Yong, Gunwoo, et al. "Prompt engineering for zero-shot and few-shot defect detection and classification using a visual-language pretrained model." Computer-Aided Civil and Infrastructure Engineering (2022). [Abstract Only].

Ming, Yifei et al., "Delving into Out-of-Distribution Detection with Vision-Language Representations," arXiv preprint arXiv:2211. 13445, Dated: Nov. 24, 2022, pp. 1-22.

Vitjan Zavrtanik et al., "DREAM—A discriminatively trained reconstruction embedding for surface anomaly detection," Proceedings of the IEEE/CVF International Conference on Computer Vision (ICCV), 2021, pp. 8330-8339.

Chun-Liang Li et al., "CutPaste: Self-Supervised Learning for Anomaly Detection and Localization," Proceedings of the IEE/CVF Conference on Computer Vision and Pattern Recognition (CVPR), 2021, pp. 9664-9674.

Radford et al., "Learning Transferable Visual Models From Natural Language Supervision", arXiv:2103.00020v1 [cs. CV], Feb. 26, 2021, 48 pages.

* cited by examiner

100

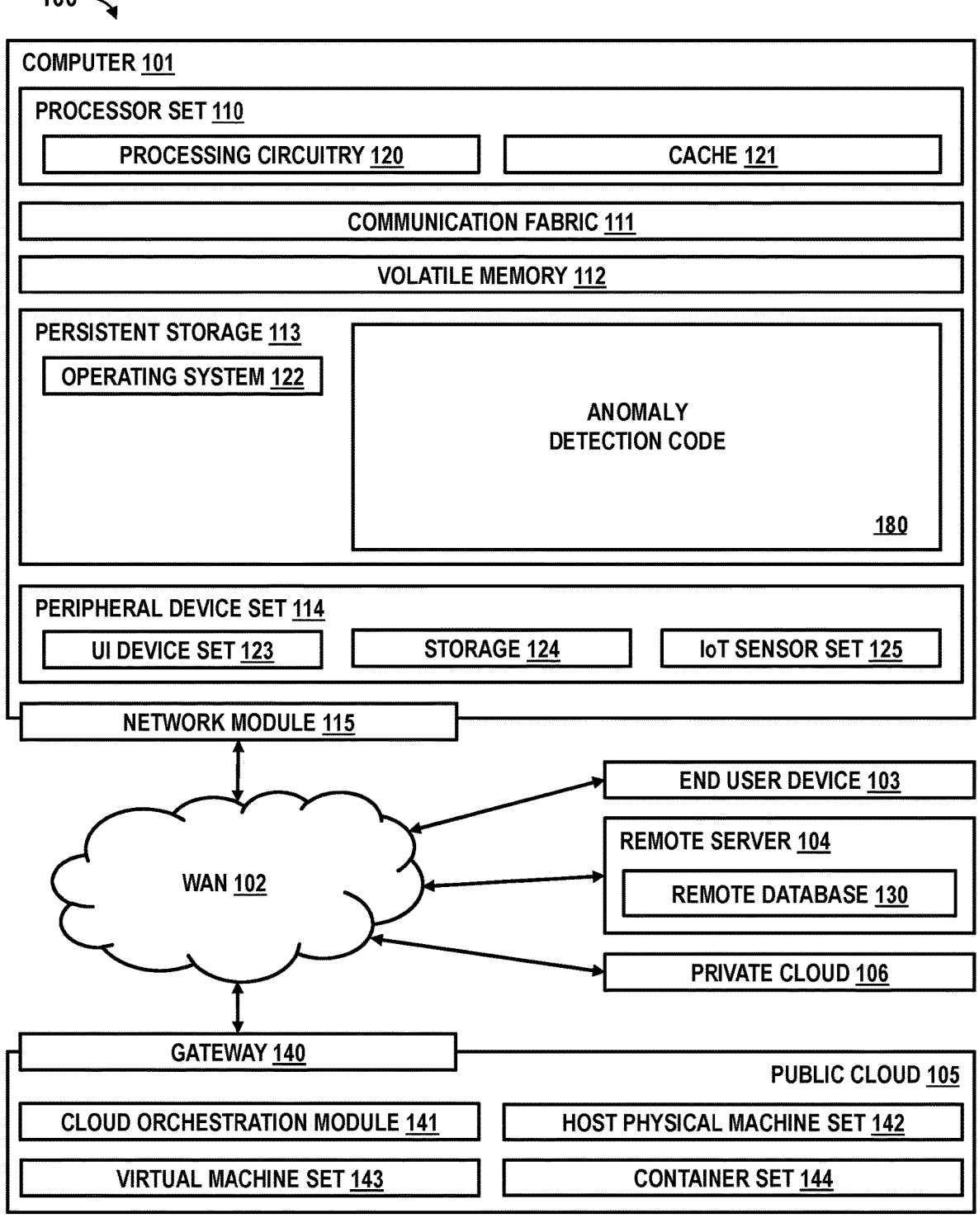

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

ANOMALY
DETECTION CODE

180

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

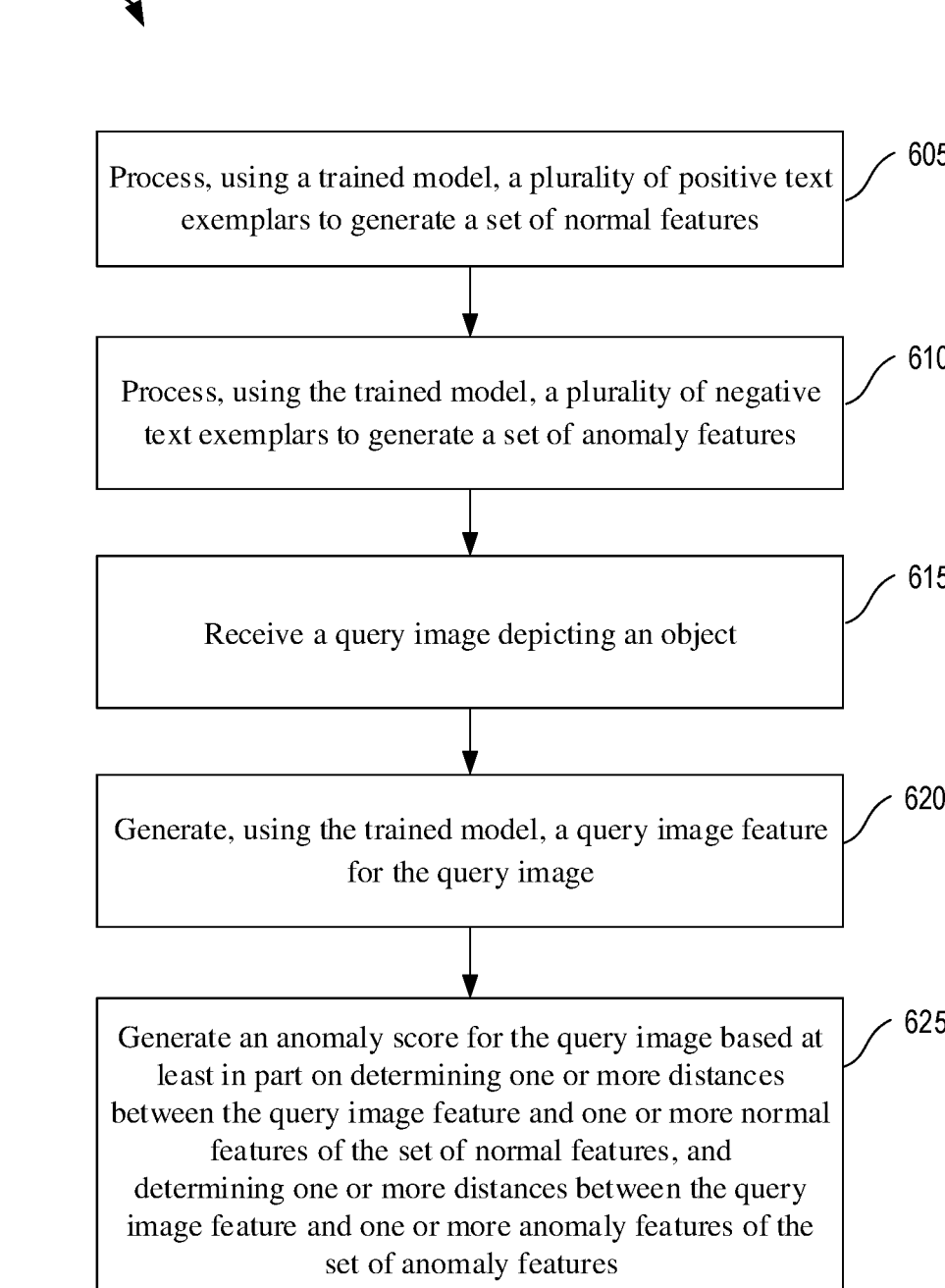

Process, using a trained model, a plurality of positive text exemplars to generate a set of normal features ⟋ 605

Process, using the trained model, a plurality of negative text exemplars to generate a set of anomaly features ⟋ 610

Receive a query image depicting an object ⟋ 615

Generate, using the trained model, a query image feature for the query image ⟋ 620

Generate an anomaly score for the query image based at least in part on determining one or more distances between the query image feature and one or more normal features of the set of normal features, and determining one or more distances between the query image feature and one or more anomaly features of the set of anomaly features ⟋ 625

*FIG. 6*

700

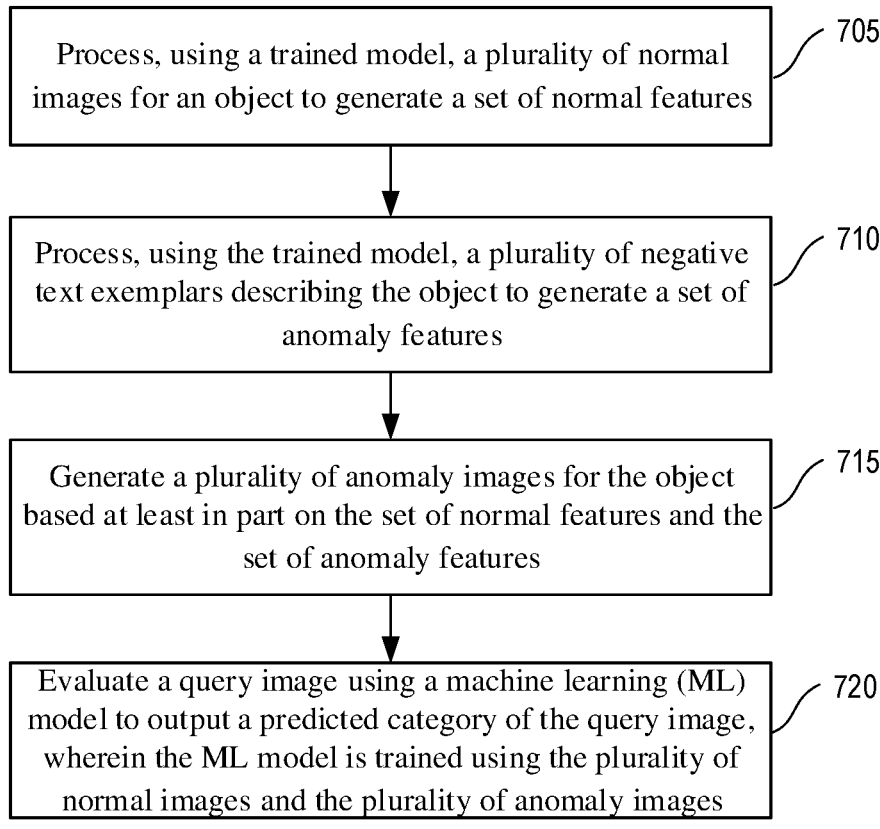

Process, using a trained model, a plurality of normal images for an object to generate a set of normal features    705

Process, using the trained model, a plurality of negative text exemplars describing the object to generate a set of anomaly features    710

Generate a plurality of anomaly images for the object based at least in part on the set of normal features and the set of anomaly features    715

Evaluate a query image using a machine learning (ML) model to output a predicted category of the query image, wherein the ML model is trained using the plurality of normal images and the plurality of anomaly images    720

FIG. 7

TEXT-BASED IMAGE ANOMALY DETECTION

BACKGROUND

The present invention relates to image processing, and more specifically, to image anomaly detection.

Anomaly detection is a technique that can be used to detect abnormal patterns or defective objects in images. This technique has been applied across various fields, such as identifying defects in industrial products, detecting unusual or suspicious activities in real-time surveillance footage, spotting disease symptoms or abnormalities in medical imaging (such as MRI scans or X-ray images), and tracking abnormal patterns in machine behavior to alert about potential malfunctions.

Some conventional approaches for training anomaly detection models typically involve training a classifier model on a labeled dataset containing both normal and abnormal images. This approach, however, is often time-consuming and labor-intensive, primarily because it requires a large amount of labeled data for effective model training. Moreover, because the nature of anomalies can change over time, the anomaly detection models developed in such dynamic environments may rapidly become outdated. Therefore, to maintain the trained model's accuracy, regular and ongoing retraining is required for these conventional approaches.

SUMMARY

One embodiment presented in this disclosure provides a method, including processing, using a trained model, a plurality of positive text exemplars to generate a set of normal features, processing, using the trained model, a plurality of negative text exemplars to generate a set of anomaly features, receiving a query image depicting an object, generating, using the trained model, a query image feature for the query image, and generating an anomaly score for the query image based at least in part on determining one or more distances between the query image feature and one or more normal features of the set of normal features, and determining one or more distances between the query image feature and one or more anomaly features of the set of anomaly features.

Another embodiment in this disclosure provide non-transitory computer-readable mediums containing computer program code that, when executed by operation of one or more computer processors, performs operations, including processing, using a trained model, a plurality of positive text exemplars to generate a set of normal features, processing, using the trained model, a plurality of negative text exemplars to generate a set of anomaly features, receiving a query image depicting an object, generating, using the trained model, a query image feature for the query image, and generating an anomaly score for the query image based at least in part on determining one or more distances between the query image feature and one or more normal features of the set of normal features, and determining one or more distances between the query image feature and one or more anomaly features of the set of anomaly features.

Another embodiment presented in this disclosure provides a method, including processing, using a trained model, a plurality of normal images for an object to generate a set of normal features, processing, using the trained model, a plurality of negative text exemplars describing the object to generate a set of anomaly features, generating a plurality of anomaly images for the object based at least in part on the set of normal features and the set of anomaly features, and evaluating a query image using a machine learning (ML) model to output a predicted category of the query image, where the ML model is trained using the plurality of normal images and the plurality of anomaly images.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 depicts an example computing environment for the execution of at least some of the computer code involved in performing the inventive methods.

FIG. 6 is a flow diagram depicting an example image anomaly detection method, according to some embodiments of the present disclosure.

FIG. 7 is a flow diagram depicting an example image anomaly detection method with reconstructed anomaly images, according to some embodiments of the present disclosure.

DETAILED DESCRIPTION

Figure 2:
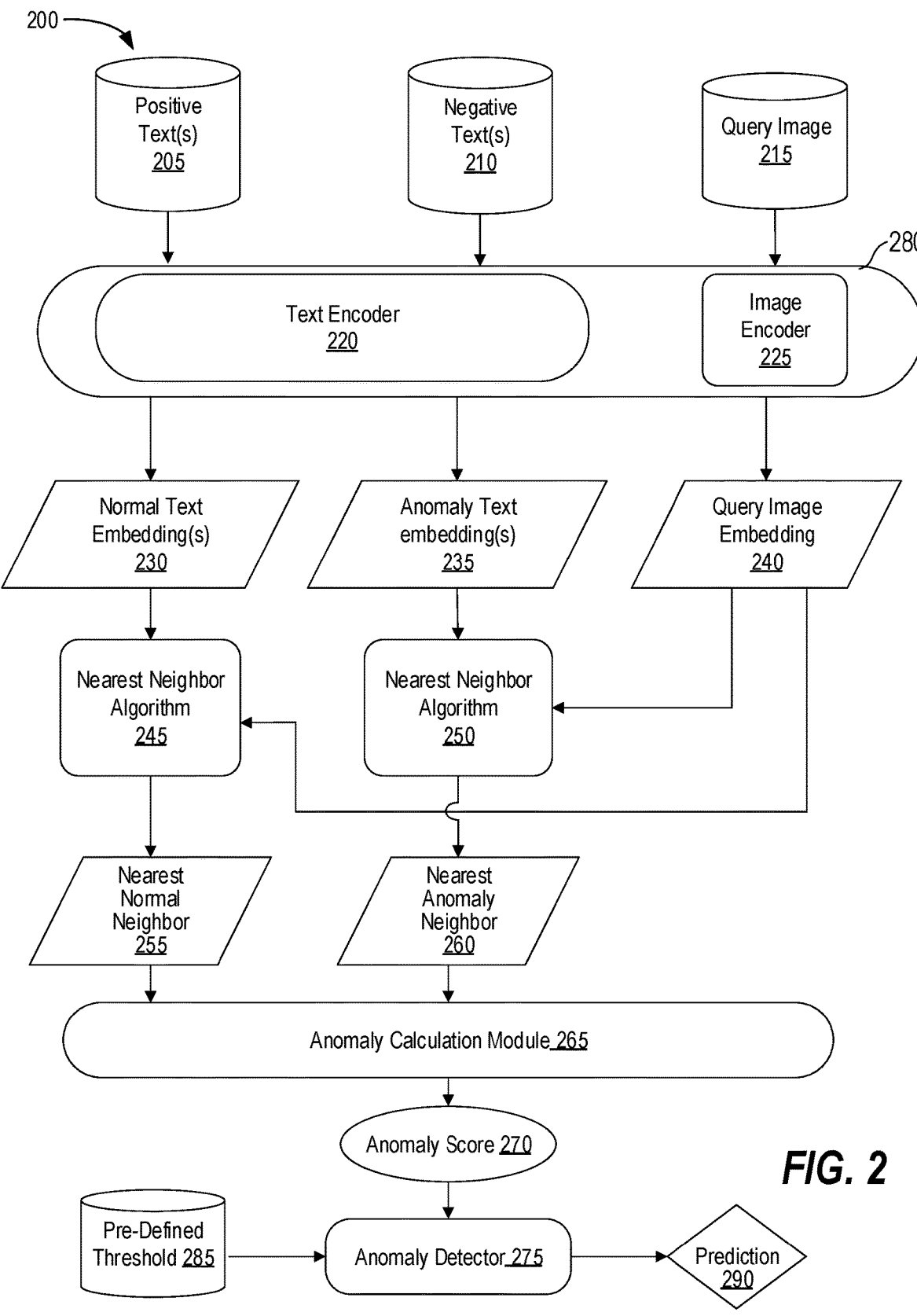
FIG. 2 depicts an example workflow for zero-shot image anomaly detection model, according to some embodiments of the present disclosure.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In many conventional systems, anomaly detection models may rapidly become outdated due to the dynamic and evolving nature of the anomalies. Traditional learning models typically requires extensive retraining and updating to accommodate these changes, which can both time-consuming and labor-intensive. In contrast, few-shot or zero-shot learning models, which are designed to learn new patterns from minimal or no labeled examples, can adapt to new contexts and situations quicker and with significantly less expenses and labor, therefore providing a more efficient solution.

Embodiments herein describe a text-based approach for developing few-shot, one-shot, and/or zero-shot anomaly detection models using one or more pre-trained vision-language models. As used herein, "zero-shot" image anomaly detection may refer to training or generating a model and/or performing anomaly detection for images without using any images during the model training/generation phase (e.g., without having any labeled normal or anomalous images to create the model). Similarly, as used herein, "one-shot" and "few-shot" image anomaly detection may refer to training or generating a model and/or performing anomaly detection for images while using one (or few, respectively) images during the model training/generation phase (e.g., a small set of labeled normal images to create the model).

For example, zero-shot anomaly detection model may be developed by using a pre-trained vision-language model to transform training texts for an object (including positive and negative textual descriptions of the object) and a query image into a shared embedding space. By comparing the distances (or similarities) between the query image and positive descriptions, and the distances (or similarities) between the query image and negative descriptions, the anomaly detection model may generate an anomaly score for the query image, which can then be used to determine whether the query image contains a normal or an anomalous object. In another embodiment, one-shot (or few-shot) anomaly detection model may be developed by using a pre-trained vision-language model to transform texts for an object (including positive and negative descriptions of the object) and one or more known normal images into a shared embedding space during training phase. At runtime, the model may generate an anomaly score for a query image by comparing the distances (or similarities) between the query image and normal image(s) and positive descriptions, and the distances (or similarities) between the query image and negative descriptions. Based on the anomaly score, the model may determine whether the object within the query image is normal or defective. In another embodiment, a text-to-image generator may be utilized to create anomaly images for an object based on the negative descriptions of the object. These generated anomaly images, along with the object's known normal images, may then be used to train a binary classification model to distinguish between normal images and anomaly images.

FIG. 1 depicts an example computing environment for the execution of at least some of the computer code involved in performing the inventive methods.

Computing environment 100 contains an example of an environment for the execution of at least some of the computer code involved in performing the inventive methods, such as anomaly detection code 180. In addition to anomaly detection code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and anomaly detection code 180, as identified above), peripheral device set 114 (including user interface (UI) device set 123, storage 124, and Internet of Things (IoT) sensor set 125), and network module 115.

Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in anomaly detection code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in anomaly detection code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts an example workflow 200 for zero-shot image anomaly detection model, according to some embodiments of the present disclosure. In some embodiments, the workflow 200 may be performed by a computing device, such as the computing device 800 of FIG. 8.

In the illustrated example, positive and negative textual descriptions of an object are applied to a pre-trained vision-language model 280 during training. The pre-trained vision-language model 280 includes a text encoder 220 and an image encoder 225. The image encoder is used to process images and transform them into image embeddings, whereas the text encoder is used to process texts and transform them into text embeddings. In some embodiments, the pre-trained vision-language model 280 is a Contrastive Language-Image Pre-training (CLIP) model. In some embodiments, the pre-trained vision-language model 280 is a Cyclic Contrastive Language-Image Pretraining (CyCLIP) model. In some embodiments, the pre-trained vision-language model 280 is a Bootstrapping Language-Image Pre-training (BLIP) model for unified vision-language understanding and generation. Generally, any suitable machine learning model capable of transforming text and images into a shared embedding space can be used.

As illustrated, the positive texts 205 describing the object are transformed by the text encoder 220 into normal text embeddings 230 (also referred to in some embodiments as normal text features). Each of these normal text embeddings 230 represent a point in a shared embedding space. The negative texts 210 describing the object are transformed by the text encoder 220 into anomaly text embeddings 235 (also referred to in some embodiments as anomaly text features). Each of these anomaly text embeddings 235 similarly represent a point in the shared embedding space. In some embodiments, the positive texts 205 may generally describe desirable, normal, or healthy conditions of an object, including the object being in a standard or expected state. For example, the positive texts 205 may include words like "good," "normal," or "standard." In some embodiments, the negative texts 210 may describe undesirable, abnormal, or defective conditions of an object. These may include indications of the object being in a defective state deviated from the standard or expected state. For example, the negative texts 210 may include words like "bad," "cracked," "broken," or "defective."

In some embodiments, each of the positive texts 205 and each of the negative texts 210 can generally include a single word (e.g., "good" and "bad") and/or phrases of multiple words (e.g., "good shape" and "bad color"). In some aspects, the particular words and/or phrases used for positive texts 205 and negative texts 210 may vary depending on the particular implementation or the particular solution provided by the model. For example, if the anomaly model is being created to identify images of anomalous walnuts, negative texts 210 such as "cracked" may be used, along with positive texts 205 such as "smooth." As another example, if the anomaly model is being created to identify images of anomalous clothing, the negative texts 210 may include terms such as "wrinkled" and "stained," while the positive texts 205 may include terms such as "crisp" and "clean." In some embodiments, some or all of the positive texts 205 and negative texts 210 may be defined or curated manually (e.g., by a user or administrator).

At runtime, as illustrated, a query image 215 depicting an object (e.g., a walnut) is input into the pre-trained vision-language model 280, resulting in generation (by the image encoder 225) of a query image embedding 240 (also referred to in some aspects as a query image feature). The normal text embeddings 230 and the query image embeddings 240 are then provided to the nearest neighbor algorithm 245, which calculates the distances between the query image embedding and each of the normal text embeddings. In some embodiments, the nearest neighbor algorithm 245, based on calculated distances, identifies the nearest normal neighbor 255 (e.g., the closest point), among the normal text embeddings 230, relative to the query image embedding 240. That is, the nearest normal neighbor 255 represents a normal text embedding 230 that has the smallest distance to the query image embedding 240. The identification of the nearest neighbor allows the system to determine the closest distance between the embeddings of the positive texts 205 and the query image 215 (e.g., the positive text 205 that is most similar to the query image 215).

In the illustrated example, the nearest neighbor algorithm 250 calculates the distances between the query image embedding 240 and each of the anomaly text embeddings 235, and identifies the nearest anomaly neighbor 260 (e.g., the closest point), among the anomaly text embeddings 235, relative to the query image embedding 240. That is, the nearest anomaly neighbor 260 represents an anomaly text embedding 235 that is closest to the query image embedding 240 (e.g., the negative text 210 that is most similar to the query image 215).

Although the nearest neighbor algorithms 245 and 250 are depicted as discrete components, in some embodiments, the operations of identifying nearest neighbors among the normal text embeddings 230 and anomaly text embeddings 235 may be performed by a single component. Additionally, although the illustrated example depicts evaluation of the nearest normal neighbor 255 and the nearest anomaly neighbor 260, in some embodiments, the system may evaluate multiple such embeddings. That is, the nearest neighbors 255 and 260 may indicate aggregated information for the top N normal text embeddings 230 and anomaly text embeddings 235, respectively. For example, the nearest normal neighbor 255 may instead indicate the sum or average of the distances to the top three normal text embeddings 230, and the nearest anomaly neighbor 260 may instead indicate the sum or average of the distances to the top three anomaly text embeddings 235.

In the illustrated example, the identified nearest neighbors (e.g., 255 and 260) are input into the anomaly calculation module 265, which calculates or evaluates the distances between the query image embedding 240 and each of these nearest neighbors (e.g., 255 and 260) to determine or generate an anomaly score 270 for the query image 215 based on these distances. For example, in some embodiments, the anomaly score 270 is determined by subtracting the distance to the nearest normal neighbor 255 from the distance to the nearest anomaly neighbor 260.

In some aspects, the anomaly calculation module 265 may perform other operations to generate the anomaly score 270, such as computing the score using one or more algorithms (beyond solely subtracting the two), processing the distances using one or more trained machine learning models to generate an anomaly score 270 indicating whether the query image 215 is anomalous, and the like.

Generally, a wide variety of metrics may be used to measure the distance between two embeddings in a shared embedding space. In some embodiments, the cosine similarity may be used to represent the distance (or similarity) between two embeddings. The cosine similarity measures the angle between two embeddings in a shared embedding space, and may range between 0 and 1, where 0 indicates the two embeddings are orthogonal to each other, suggesting they are completely dissimilar, and 1 indicates the two embeddings are identical, suggesting they are completely similar. In some embodiments, the Euclidean distance may be used to represent the distance (or similarity) between two embeddings. The Euclidean distance measures the straight-line distance between two embeddings in a shared embedding space, and may range from 0 to infinity.

In the illustrated example, the anomaly score 270 is then provided to the anomaly detector 275, where the anomaly score 270 is compared with a defined threshold 285 to generate a prediction 290 that indicates whether the object depicted in the query image 215 is normal or defective/anomalous. In some embodiments, the anomaly detector 275 may determine that a positive score (e.g., larger than zero) indicating that the query image 215 is more similar to the anomaly text embeddings 235 suggests or indicates that the image depicts an anomaly, whereas a negative score (e.g., less than zero) indicating that the query image 215 is more similar to the normal text embeddings 230 suggests or indicates that no anomaly is depicted.

In some embodiments, the defined threshold 285 is defined through the analysis of historical data records, such as based on evaluating the statistical distribution of previously recorded scores. In some embodiments, a machine learning model may be trained to classify the anomaly score using a dataset composed of query images with known anomaly scores and their corresponding labels (e.g., "normal" or "anomalous"). Generally, the machine learning algorithms or architectures used in the trained models to classify anomaly scores may include logistic regressions, support vector machines, random forests, neural networks, or any other suitable machine learning algorithms.

Figure 3:
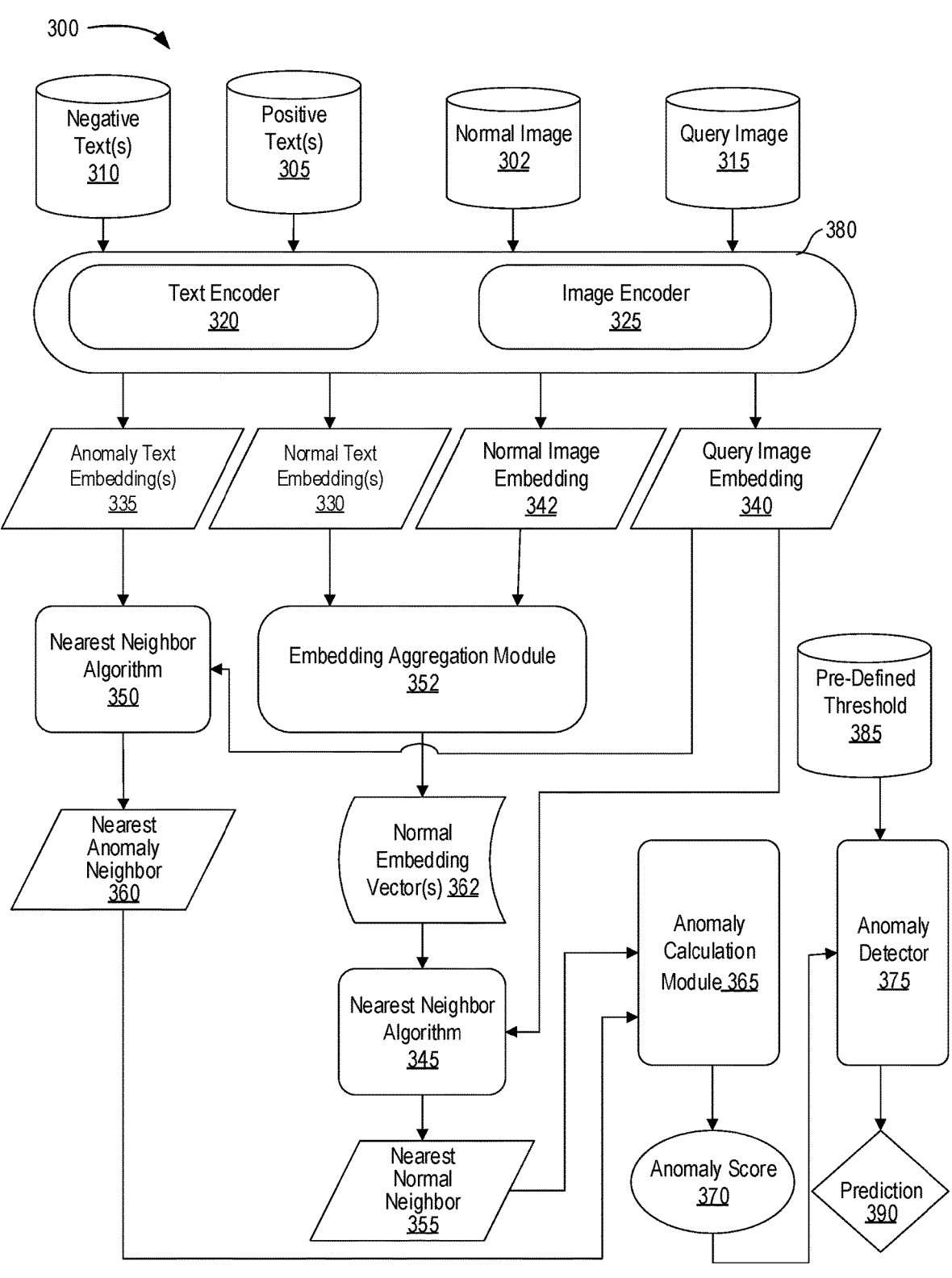
FIG. 3 depicts an example workflow for one-shot or few-shot image anomaly detection model, according to some embodiments of the present disclosure.

FIG. 3 depicts an example workflow 300 for one-shot or few-shot image anomaly detection model, according to some embodiments of the present disclosure. In some embodiments, the workflow 300 may be performed by a computing device, such as the computing device 800 of FIG. 8.

In the illustrated example, a normal image 302 depicting an object, along with positive and negative textual descriptions (e.g., 310 and 305, respectively) for the object, are provided to a pre-trained vision-language model 380 (which may correspond to the model 280 of FIG. 2) during a training phase. The image encoder 325 within the pre-trained vision-language model 380 generates a normal image embedding 342 (also referred to in some aspects as normal image features) for the normal image 302. The text encoder 320 within the model 380 similarly generates anomaly text embeddings 335 (also referred to as anomaly text features) for the negative texts 310, as well as normal text embeddings 330 (also referred to as normal text features) for the positive texts 305. As discussed above, in some embodiments, the positive texts 305 may describe desirable, normal, or healthy conditions of an object, including the words like "good," "normal," or "standard." In some embodiments, the negative texts 310 may describe undesirable, abnormal, or defective conditions of an object, including the words like "bad," "cracked," "broken," or "defective."

As illustrated, the normal text embeddings 330 and the normal image embedding 342 are provided to the embedding aggregation module 352, which aggregates the normal image embedding 342 and each normal text embedding 330 to form a combined reference vector (e.g., normal embedding vector 362). The combined reference vector represents a combined concept of a "normal object" and contains information from both images and texts. For example, in some embodiments, the aggregation operation is performed by adding, averaging, or otherwise aggregating the normal text embeddings 330 and the normal image embedding 342 to form a combined vector that perseveres the information from both positive texts 305 and the normal image 302. That is, for each respective normal text embedding 330, the embedding aggregation module 352 may generate a respective normal embedding vector 362 by combining the respective normal text embedding 330 with the (single) normal image embedding 342.

In some embodiments, more than one normal images 302 depicting the object are provided to the pre-trained vision-language model 380 during the training phase. Each normal image may have a corresponding positive text description 305. The normal images 302 are then processed by the image encoder 325 to generate a set of normal image embeddings 342. The normal image embeddings 342, along with their corresponding normal text embeddings 330, are aggregated by the embedding aggregation module 352 to form a set of combined reference vectors (e.g., normal embedding vectors 362). The combined reference vectors 362 represents a combined concept of a "normal object" and perseveres the information from both positive texts 305 and normal images 302. That is, the embedding aggregation module 352 may generate a set of normal embedding vectors 362 by combining each normal text embedding 330 with its respective normal image embedding 342.

In the illustrated example, a query image 315 for the object is received at runtime, used, by the image encoder 325, to generate a query image embedding 340 (also referred to in some aspects as a query image feature). The set of combined reference vectors (e.g., normal embedding vectors 362), along with the query image embedding 340, are then provide to the nearest neighbor algorithm 345 to identify the nearest normal neighbor 355 (e.g., the closest point), among the combined reference vectors (the normal embedding vectors 362), relative to the query image embedding 340. By combining the normal text embeddings 330 with the normal image embedding 342, the system may determine how closely the query image aligns with the combined concept of a "normal object" as represented by the positive texts 305 and the normal image 302. That is, the system may determine the closest distance between the query image embedding 340 and normal embedding vectors 362. In some embodiments, as discussed above, the nearest normal neighbor 355 may additionally or alternatively indicate the aggregate of multiple nearest neighbors (e.g., the sum or average of the three nearest normal embedding vectors 362).

In the illustrated example, the nearest neighbor algorithm 350 receives the anomaly text embeddings 335 and the query image embedding 340, and identifies the nearest anomaly neighbor 360 (e.g., the closest point), among the anomaly text embeddings 335, relative to the query image embedding 340. In some embodiments, as discussed above, the nearest anomaly neighbor 360 may additionally or alternatively indicate the aggregate of multiple nearest neighbors (e.g., the sum or average of the three nearest anomaly text embeddings 335). Although the nearest neighbor algorithms 350 and 345 are depicted as discrete components, in some embodiments, the operations of identifying nearest neighbors among the normal embedding vectors 362 and anomaly text embeddings 335 may be performed by a single component.

In the illustrated example, the anomaly calculation module 365 receives the nearest anomaly neighbor 360, the nearest normal neighbor 355. Based on the received data, the anomaly calculation module 365 calculates the distances between the query image embedding 340 and each of the nearest neighbors (e.g., 355 and 360) to generate an anomaly score 370. In some embodiments, the anomaly score is determined by subtracting the distance to the nearest normal neighbor 355 from the distance to the nearest anomaly neighbor 360. Given that the nearest normal neighbor 355 is a combination of text and image embeddings, and the nearest anomaly neighbor 360 is solely a text embedding, the similarly between the nearest normal neighbor 355 and the query image embedding 340 may generally be larger (e.g., the distance will be smaller) than the similarly between the nearest anomaly neighbor 360 and the query image embedding 340. This discrepancy arises from the fact that in practice, text embeddings and image embeddings are laying on different manifolds within the shared embedding space. Therefore, in some embodiments, a weight may be factored in to eliminate or reduce the discrepancy during the distance calculation between the query image embedding 340 and each of the nearest neighbors (355 and 360), to further improve the accuracy of the anomaly detection model.

As discussed above, one or more metrics may be used to measure the distance between two embeddings in the shared embedding space, including cosine similarity, Euclidean distance, and the like. The generated anomaly score 370 is then compared with a defined threshold 385, by the anomaly detector 375, to determine whether the object depicted in the query image is normal or anomalous (as indicated in the prediction 390). As discussed above, in some embodiments, the defined threshold 385 is defined as zero, where a positive score suggests the query image is anomalous, and a negative score suggests the query image is normal. In some embodiments, the pre-defined threshold is defined by analyzing the statistical distribution of scores within historical data records. In some embodiments, a machine learning model may be trained to classify the anomaly score.

Figure 4:
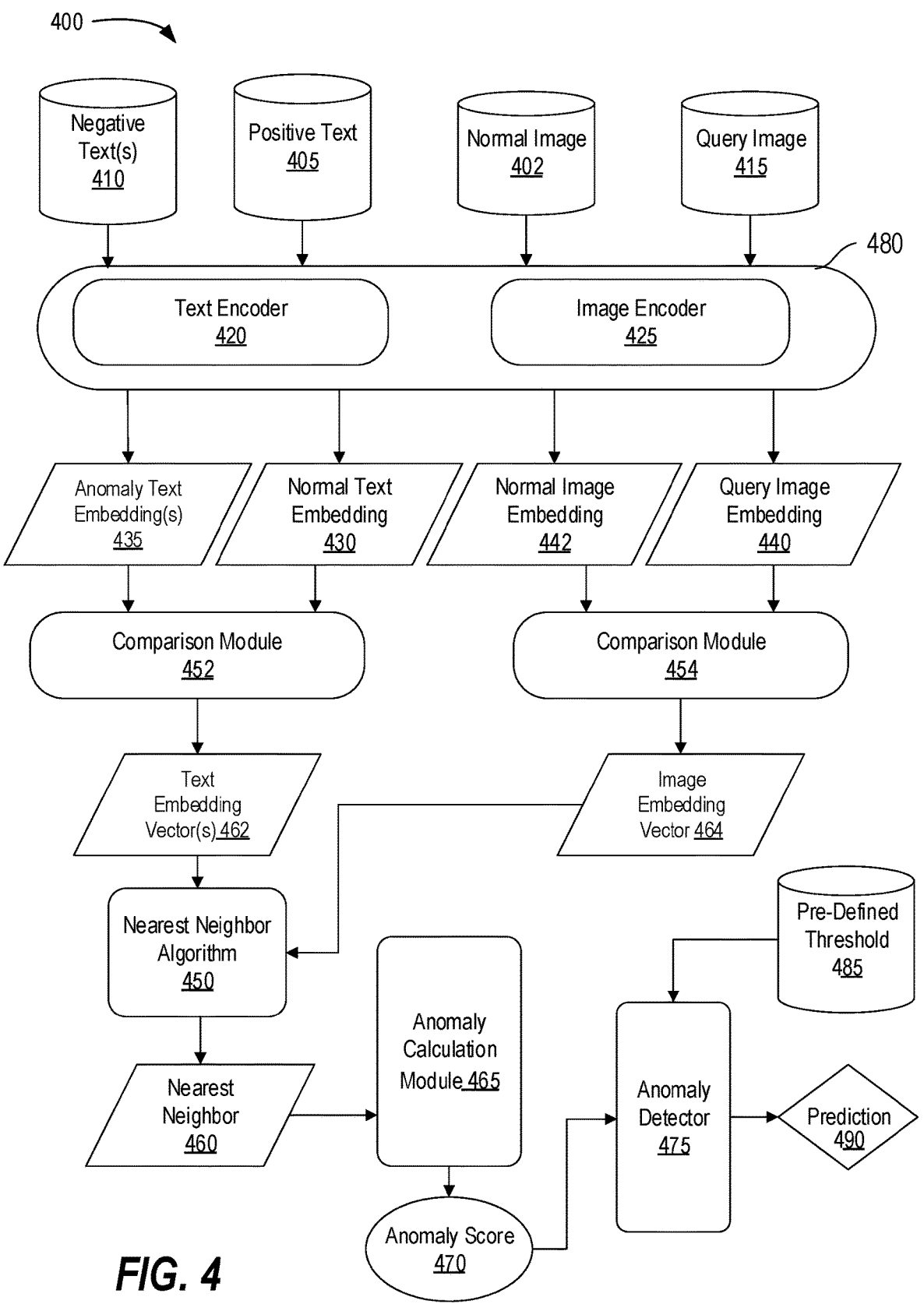
FIG. 4 depicts an example workflow for one-shot or few-shot image anomaly detection model, according to some embodiments of the present disclosure.

FIG. 4 depicts an example workflow 400 for one-shot or few-shot image anomaly detection model, according to some embodiments of the present disclosure. In some embodiments, the workflow 400 may be performed by a computing device, such as the computing device 800 of FIG. 8.

As illustrated, during a training phase, a pre-trained vision-language model 480 (which may correspond to the model 280 of FIG. 2, and/or the model 380 of FIG. 3) receives a normal image 402 for a specific object, as well as positive and negative texts (e.g., 405 and 410), respectively, describing the object. The image encoder 425 generates a normal image embedding 442 (also referred to in some aspects as a normal image feature) for the normal image 402. The text encoder 420 generates anomaly text embeddings 435 (also referred to in some aspects as anomaly text features) for the negative texts 410, and also generates one or more normal text embeddings 430 (also referred to in some aspects as normal text features) for the positive text(s) 405. As discussed above, in some embodiments, the positive texts 405 may describe desirable, normal, or healthy conditions of an object, including the words like "good," "normal," or "standard." In some embodiments, the negative texts 410 may describe undesirable, abnormal, or defective conditions of an object, including the words like "cracked," "broken," or "defective." In the illustrated example, only one positive text 405 and only one normal image 402 are provided during training phase.

In other embodiments, more than one normal images 402 and their corresponding positive texts 405 for the object may be provided during training phase. The normal images 402 may be processed by the image encoder 425 to generate more than one normal image embeddings 442, and the normal texts 405 may be processed by the text encoder 420 to generate more than one normal text embeddings 430.

In contrast to the embodiment illustrated in FIG. 3, in which combined vectors represented by the positive texts and the normal image are created and compared with the query image embedding, in the workflow 400, the anomaly text embeddings 435 are compared with the normal text embedding(s) 430, and the query image embedding 440 is compared with the normal image embedding(s) 442. In the illustrated example, the comparison module 452 receives the anomaly text embeddings 435 and the normal text embedding 430, and subtracts each of the anomaly text embeddings 435 from the normal text embedding 430 to generate a new vector (e.g., text embedding vector 462). Each of the new vectors represents a relative distance and position between one of the anomaly text embeddings 435 and the normal text embedding 430. Similarly, the comparison module 454 subtracts the query image embedding 440 from the normal image embedding 442 to generate an image embedding vector 464. The image embedding vector 464 represents the relative distance between the query image embedding and the normal image embedding. Although the comparison modules 452 and 454 are depicted as discrete components, in some embodiments, the comparison operations between text embeddings and image embeddings may be performed by a single component.

In some embodiments, when more than one normal images 402 and their corresponding positive texts 405 for the object are provided during the training phase, the comparison module 452 may calculate the average of the normal text embeddings 430, and subtract each of the anomaly text embeddings 435 from the average normal text embedding to generate a new vector (e.g., text embedding vector 462). The comparison module 454 may similarly calculate the average of the normal image embeddings 442, and subtract the query image embedding 440 from the average normal image embedding to generate an image embedding vector 464. In some embodiments, the system may select one normal image and its corresponding positive text as the representative from the sets. The comparison module 452 may subtract each of the anomaly text embeddings 435 from the selected normal text embedding to generate a new vector (e.g., text embedding vector 462), and the comparison module 454 may similarly subtract the query image embedding 440 from the selected normal image embedding to generate an image embedding vector 464. In the illustrated example, the outputs of the comparison modules 452 and 454—the text embedding vectors 462, as well as the image embedding vector 464—are provided to nearest neighbor algorithm 450. The nearest neighbor algorithm 450 identifies the nearest neighbor 460 (e.g., the closest point), among the text embedding vectors 462, relative to the image embedding vector 464. That is, the identified nearest neighbor 460 represent a text embedding vector 462 that has the smallest distance to the image embedding vector 464. The anomaly calculation module 465 then outputs an anomaly score 470 for the query image based on the distance between the identified nearest neighbor 460 and the image embedding vector 464 (as indicated by the nearest neighbor 460). A higher distance may indicate the relative distance between the anomaly text embeddings 435 and the normal text embedding 430 is much larger than the relative distance between the query image embedding 440 and normal image embedding 442, suggesting the image is normal. In contrast, a lower distance may indicate the relative distance between the anomaly text embeddings 435 and the normal text embedding 430 is closer to the relative distance between the query image embedding 440 and normal image embedding 442, suggesting that the image is anomalous. As discussed above, one or more metrics may be used to measure the distance between two embeddings in the shared embedding space, including cosine similarity, Euclidean distance, and the like.

In the illustrated example, the generated anomaly score 470 is processed by the anomaly detector 475, in which the anomaly score 470 is compared with a defined threshold 485 to determine whether the object within the query image is normal or defective (as indicated in the prediction 490). As stated above, in some embodiments, the defined threshold may be defined by analyzing the statistical distribution of scores within historical data records. In some embodiments, a machine learning model may be trained to classify the anomaly score 470.

Figure 5:
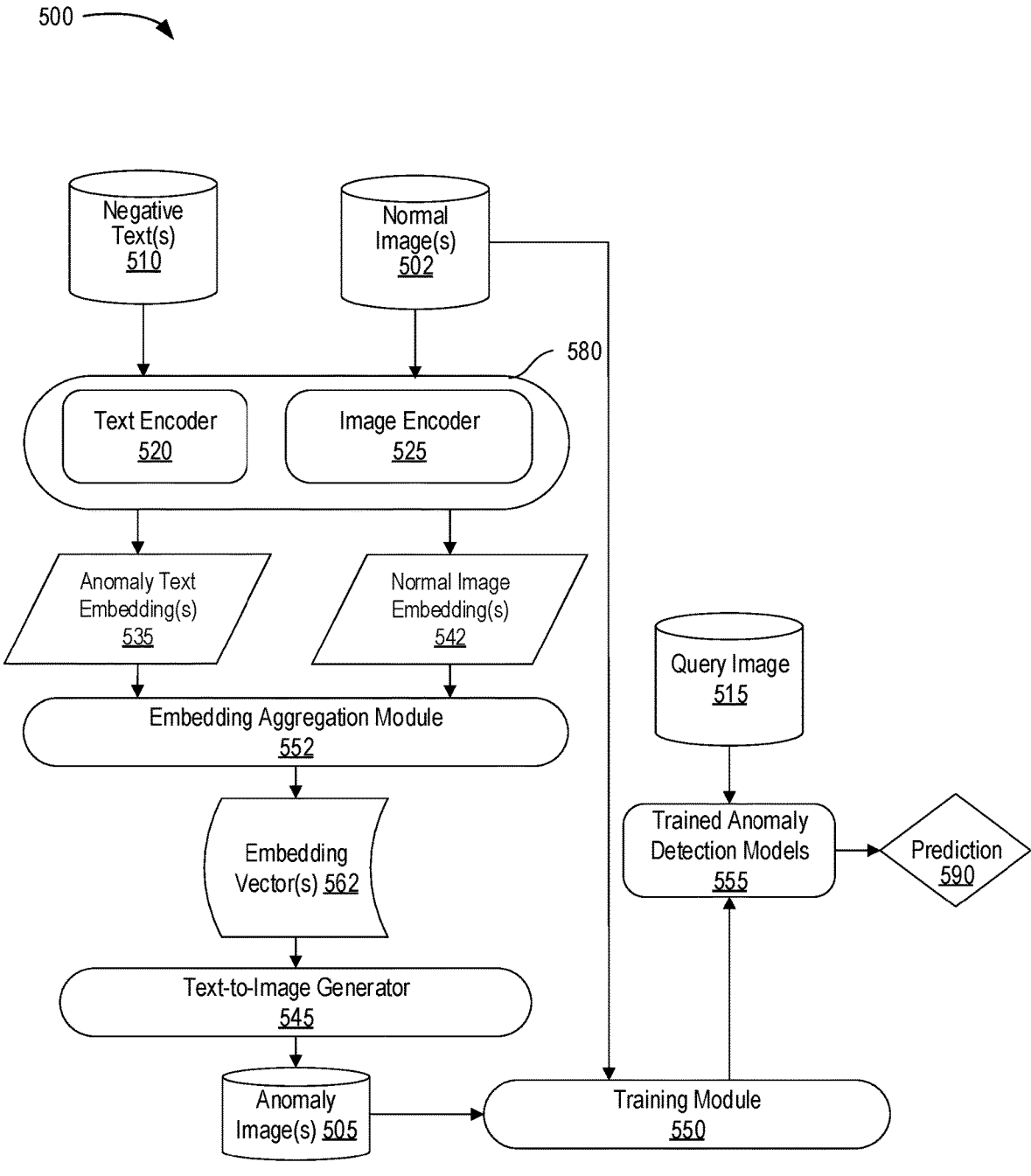
FIG. 5 depicts an example workflow for training anomaly detection model with reconstructed anomaly images, according to some embodiments of the present disclosure.

FIG. 5 depicts an example workflow 500 for training anomaly detection model with reconstructed anomaly images, according to some embodiments of the present disclosure. In some embodiments, the workflow 500 may be performed by a computing device, such as the computing device 900 of FIG. 9.

In the illustrated example, negative texts 510 and normal images 502 for a specific object are applied to a pre-trained vision-language model 580 (which may correspond to the model 280 of FIG. 2, the model 380 of FIG. 3, or the model 480 of FIG. 4). The text encoder 520 processes the negative texts 510 to generate anomaly text embeddings 535 (also referred to in some aspects as anomaly text features). The image encoder 525 processes the normal images 502 to generate normal image embeddings 542 (also referred to in some aspects as normal image features). As discussed above, in some embodiments, the negative texts 310 may describe undesirable, abnormal, or defective conditions of an object, including the words like "bad," "cracked," "broken," or "defective."

In the illustrated example, the embedding aggregation module 552 aggregates the anomaly text embeddings 535 with the normal image embeddings 542 to generate embedding vectors 562. Each of the embedding vectors 562 is a combination of text and image embeddings. In some embodiments, the aggregation operations may be performed by summing, and/or averaging each of the anomaly text embedding 535 and each of the normal image embeddings 542 to form a vector containing information from both the negative text 510 and the normal image 502. That is, for each respective pair of data (including one negative text 510 and one normal image 502), the system generates a respective embedding vector 562.

In the illustrated example, the generated embedding vectors 562 are then provided to a text-to-image generator 545, which may generate synthetic (or artificial) anomaly images 505 for the object based on the embedding vectors 562. In some embodiments, the text-to-image generator may comprises a Generative Adversarial Network (GAN) model, or any other suitable deep learning model that may generate synthetic images based on textual or vector descriptions.

In the illustrate example, the training module 550 uses both the anomaly images 505 and normal images 502 to train a machine learning model 555 to distinguish between two categories. In some embodiments, the training module 550 may properly label each of the images ("normal" or "anomalous") and split the labeled dataset into training, validation and testing sets. The training set may be used to train the model 555, the validation set may be used to further refine or tune the model 555 to achieve optimal performance, and the testing set may be used to evaluate the performance of the model 555 upon unseen data. In some embodiments, different anomaly detection models 555 are trained for different objects. For example, one anomaly detection model may be trained to detect anomalies in images of hazelnuts, another model may be trained detect anomalies in image of apples. Each model is trained using normal and anomalous images of the specific object it is designed to recognize.

In the illustrated example, at runtime, a query image 515 is analyzed by the trained anomaly detection model(s) 555 to output a prediction 590, which indicates a predicted category (e.g., "anomalous" or "normal") of the query image.

FIG. 6 is a flow diagram depicting an example image anomaly detection method, according to some embodiments of the present disclosure.

The method 600 begins at block 605, where a system (e.g., the computing device 800 of FIG. 8) processes a plurality of positive text exemplars (e.g., positive texts 205 of FIG. 2, 305 of FIG. 3, or 405 of FIG. 4) to generate a set of normal features (e.g., normal text embeddings 230 of FIG. 2, 330 of FIG. 3, 430 of FIG. 4), using a trained model (e.g., the pre-trained vision-language model 280 of FIG. 2, 380 of FIG. 3, 480 of FIG. 4). In some embodiments, the trained model is a vision-language (VL) model that transforms images and text exemplars to a unified embedding space.

At block 610, the system processes a plurality of negative text exemplars (e.g., negative texts 210 of FIG. 2, 310 of FIG. 3, or 410 of FIG. 4) to generate a set of anomaly features (e.g., anomaly text embeddings 235 of FIG. 2, 335 of FIG. 3, or 435 of FIG. 4), using the trained model (e.g., the pre-trained vision-language model 280 of FIG. 2, 380 of FIG. 3, 480 of FIG. 4).

At block 615, the system receives a query image (e.g., query image 215 of FIG. 2, 315 of FIG. 3, or 415 of FIG. 4) depicting an object.

At block 620, the system generates, using the trained model (e.g., the pre-trained vision-language model 280 of FIG. 2, 380 of FIG. 3, 480 of FIG. 4), a query image feature (query image embedding 240 of FIG. 2, 340 of FIG. 3, or 440 of FIG. 4) for the query image.

At block 625, the system determines one or more distances between the query image feature (query image embedding 240 of FIG. 2, 340 of FIG. 3, or 440 of FIG. 4) and one or more normal features of the set of normal features (normal text embeddings 230 of FIG. 2, or normal embedding vectors 362 of FIG. 3). The system also determines one or more distances between the query image feature (query image embedding 240 of FIG. 2, 340 of FIG. 3, or 440 of FIG. 4) and one or more anomaly features of the set of anomaly features (anomaly text embeddings 235 of FIG. 2, or 335 of FIG. 3). Based on the determined distances, the system generates an anomaly score (e.g., anomaly score 270 of FIG. 2, or 370 of FIG. 3) for the query image.

In some embodiments, the system may identify a first nearest neighbor (e.g., nearest normal neighbor 255 of FIG. 2, 335 of FIG. 3), among the set of normal features, for the query image feature. The system may further identify a second nearest neighbor (e.g., nearest anomaly neighbor 260 of FIG. 2, 360 of FIG. 3), among the set of anomaly features, for the query image feature. In some embodiments, the identification of nearest neighbor for the query image feature is performed by one or more nearest neighbor algorithm (e.g., 245 or 250 of FIG. 2). In some embodiments, the anomaly score for the query image is generated based at least in part on distances between the query image feature and each of the first and second nearest neighbors.

In some embodiments, the method 600 further comprises determining that the query image is anomalous by comparing the anomaly score with a defined threshold (e.g., 285 of FIG. 2, 385 of FIG. 3, or 485 of FIG. 4).

In some embodiments, the method 600 further comprises receiving a normal image for the object (e.g., 302 of FIG. 3), where the set of normal features (e.g., 362 of FIG. 3) are generated based at least in part on processing the normal image (e.g., 302 of FIG. 3) and the plurality of positive text exemplars (e.g., 305 of FIG. 3) using the trained model.

In some embodiments, the method 600 further comprises receiving a normal image for the object (e.g., 402 of FIG. 4), processing the normal image for the object to generate a normal image feature (e.g., 442 of FIG. 4) using the trained model, generating an image vector (e.g., 464 of FIG. 4) based on the normal image feature (e.g., 442 of FIG. 4) and the query image feature (e.g., 440 of FIG. 4), generating a set of text vectors (e.g., 462 of FIG. 4) based on at least one of the normal features (e.g., 430 of FIG. 4) and the set of anomaly features (e.g., 435 of FIG. 4), identify a nearest neighbor (e.g., 460 of FIG. 4), among the set of text vectors (e.g., 462 of FIG. 4), for the image vector, and generate the anomaly score (e.g., 470 of FIG. 4) for the query image based at least in part on a distance between the nearest neighbor and the image vector.

FIG. 7 is a flow diagram depicting an example image anomaly detection method with reconstructed anomaly images, according to some embodiments of the present disclosure.

The method 700 begins at block 705, where a system (e.g., the computing device 900 of FIG. 9) processes, using a trained model (e.g., 580 of FIG. 5), a plurality of normal images (e.g., 502 of FIG. 5) for an object to generate a set of normal features (e.g., 542 of FIG. 5). In some embodiments, the trained model is a vision-language (VL) model that transforms images and text exemplars to a unified embedding space.

At block 710, the system processes, using the trained model, a plurality of negative text exemplars (e.g., 510 of FIG. 5) describing the object to generate a set of anomaly features (e.g., 535 of FIG. 5).

At block 715, the system generates a plurality of anomaly images (e.g., 505 of FIG. 5) for the object based at least in part on the set of normal features (e.g., 542 of FIG. 5) and the set of anomaly features (e.g., 535 of FIG. 5). In some embodiments, the system may combine the set of normal features and the set of anomaly features to generate a set of combined vectors (e.g., 562 of FIG. 5), and evaluate the set of combined vectors using a text-to-image model (e.g., 545 of FIG. 5) to generate the plurality of anomaly images (e.g., 505 of FIG. 5) for the object.

At block 720, the system evaluates a query image using a machine learning (ML) model (e.g., 555 of FIG. 5) to output a predicted category of the query image, where the ML model is trained using the plurality of normal images and the plurality of anomaly images.

Figure 8:
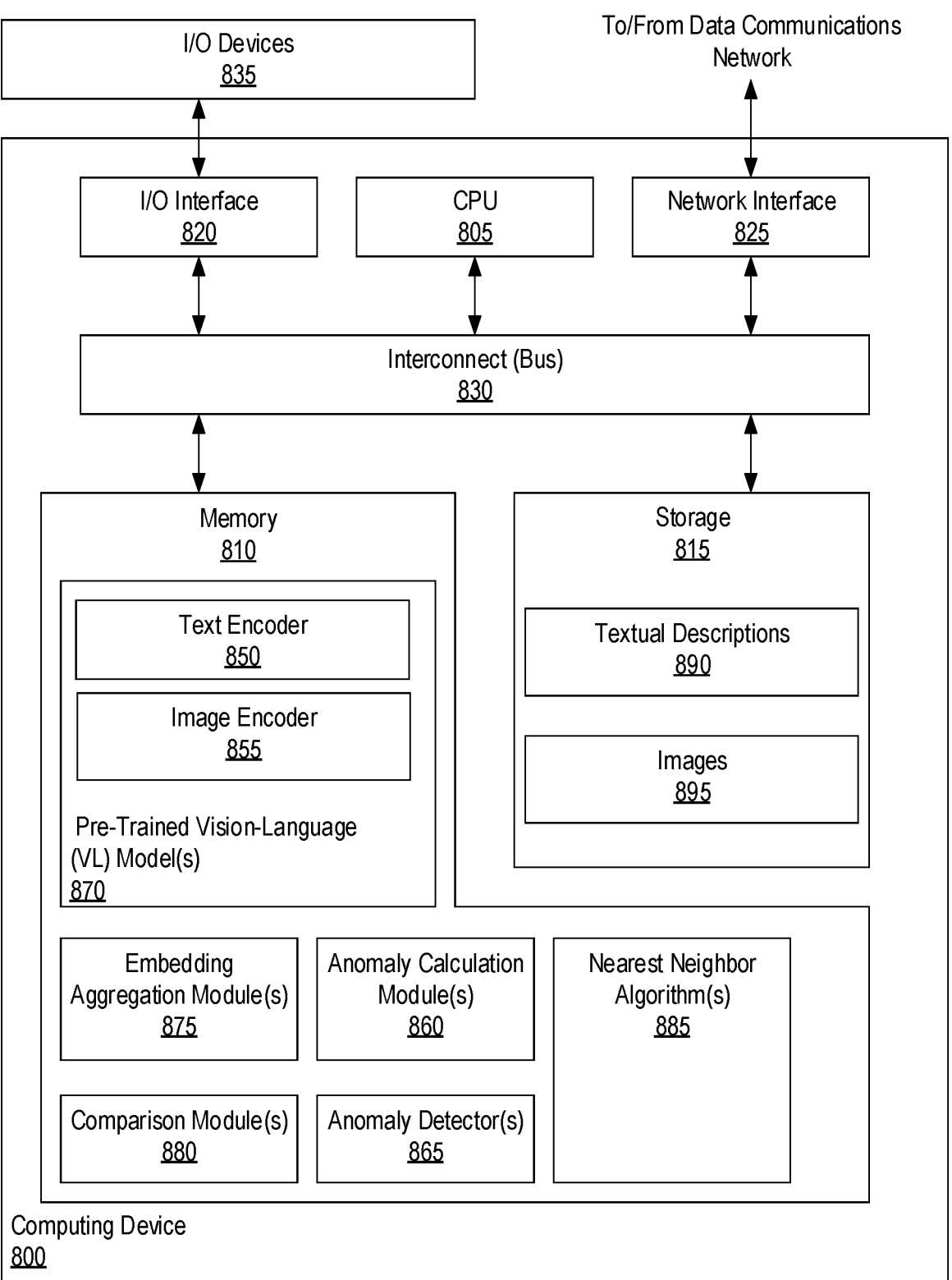
FIG. 8 depicts an example computing system for image anomaly detection, according to some embodiments of the present disclosure.

FIG. 8 depicts an example computing system for image anomaly detection, according to some embodiments of the present disclosure. Although depicted as a physical device, in embodiments, the computing device 800 may be implemented using virtual device(s), and/or across a number of devices (e.g., in a cloud environment).

As illustrated, the computing device 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a pre-trained vision-language (VL) vision model 870 (which includes a text encoder 850 and an image encoder 855), one or more embedding aggregation module(s) 875, one or more comparison module(s) 880, one or more anomaly detector(s)

865, one or more anomaly calculation module(s) 860, and one or more nearest neighbor algorithm(s) 885.

Although depicted as a discrete component for conceptual clarity, in embodiments, the operations of the depicted component (and others not illustrated) may be combined or distributed across any number of components. Further, although depicted as software residing in memory 810, in embodiments, the operations of the depicted components (and others not illustrated) may be implemented using hardware, software, or a combination of hardware and software.

In one embodiment, the pre-trained vision-language (VL) vision model 870 may transform textual descriptions and images into a shared embedding space, as discussed above. For example, the text encoder 850 within the pre-trained VL vision model 870 may generate text embeddings for each of the textual descriptions for an object. The image encoder 855 within the pre-trained VL vision model 870 may generate an image embedding for a training image applied during training or a query image applied at runtime.

In one embodiment, the embedding aggregation module 875 may aggregate two embeddings to form a combined vector (e.g., normal embedding vectors 362 of FIG. 3), as discussed above. For example, when a known normal image of an object is applied during training phase, the embedding aggregation module 875 may concatenate the training image embedding with each of text embeddings to generate a combined vector that contains information from both the image and text.

In one embodiment, the comparison module 880 may perform subtraction operations between two embeddings to form a new vector that represents relative distance and positions between the two embeddings (e.g., text embedding vectors 462 or image embedding vectors 464 of FIG. 4), as discussed above. For example, when a known normal image of an object is applied during training phase, the comparison module 880 may calculate the distance between the training image embedding and a query image embedding, such as by subtracting the query image embedding from the normal image embedding. Based on the subtraction result, the module may generate an image vector that represents the relative distance between the query image embedding and the normal image embedding, as well as the direction in the shared vector space from the query image to the normal image.

In one embodiment, the nearest neighbor algorithms 885 may calculate the distances between a query image embedding and a set of pre-defined embeddings (such as normal text embeddings, anomaly text embeddings, normal embedding vectors, or text embedding vectors). Based on the calculated distances, the nearest neighbor algorithm 885 may identify the nearest neighbor (the closest point) to the query image embedding among the set of pre-defined embeddings, which can then be used to determine the anomaly score of the query image.

In one embodiment, the anomaly calculation module 860 may calculate an anomaly score for a query image based at least in part on the query image itself, textual descriptions and/or one or more normal image applied during training, as discussed above.

In one embodiment, the anomaly detector 865 may compare the anomaly score, as mentioned above, with a pre-defined threshold to determine if the query image is normal or anomalous. As stated above, in some embodiments, the pre-defined threshold may be defined by analyzing the statistical distribution of scores within historical data records. In some embodiments, a machine learning model may be trained to classify the anomaly score 470.

In the illustrated example, the storage 815 includes textual descriptions 890 (including positive and negative texts) and images 895 (including normal or anomalous images) for different objects (e.g., apples, hazelnuts, etc.). Although depicted as residing in storage 815, the textual descriptions 890 and images 895 may be stored in any suitable location, including memory 810.

Figure 9:
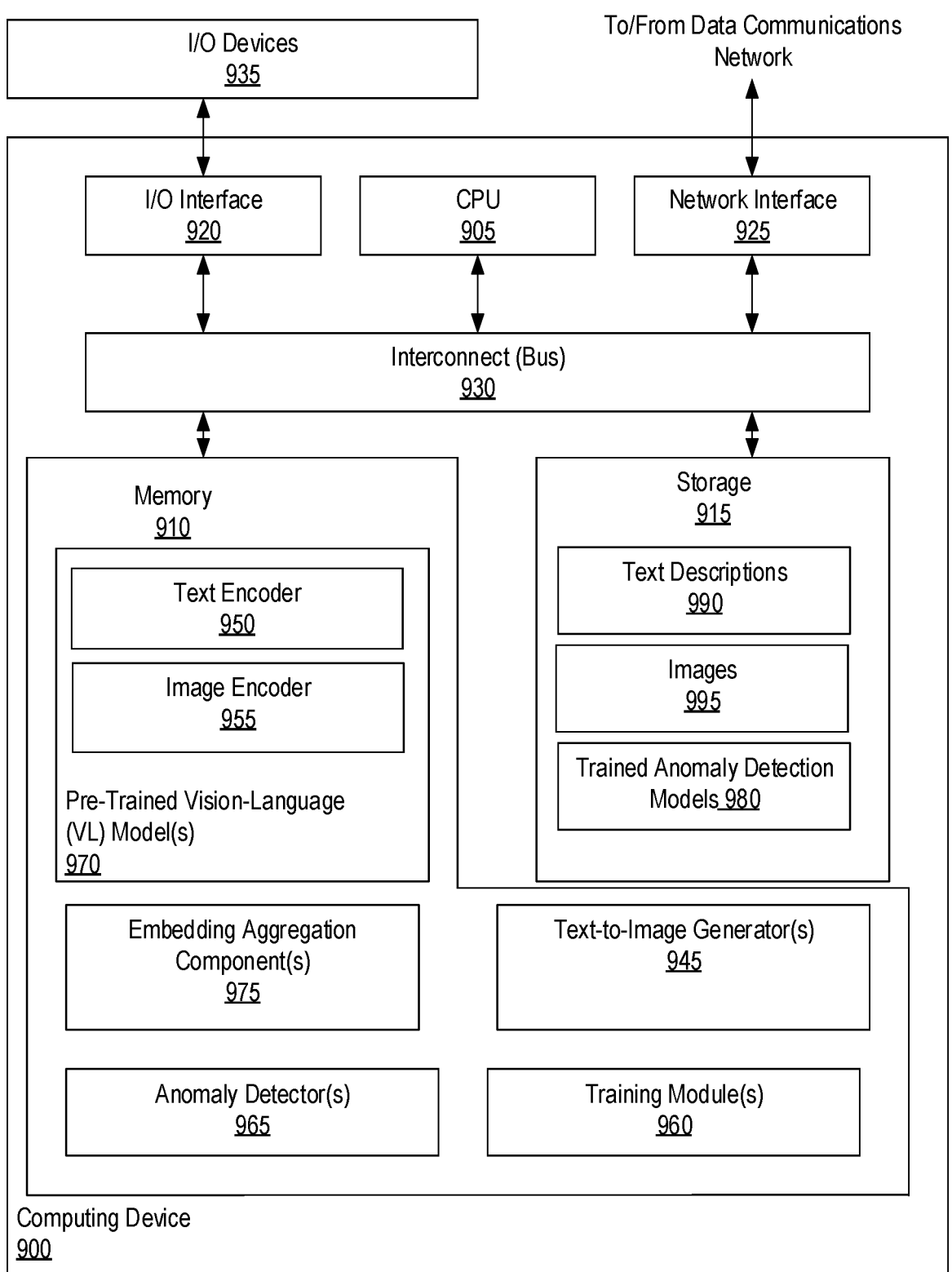
FIG. 9 depicts an example computing system for image anomaly detection with reconstructed anomaly images, according to some embodiments of the present disclosure.

FIG. 9 depicts an example computing system for image anomaly detection with reconstructed anomaly images, according to some embodiments of the present disclosure. Although depicted as a physical device, in embodiments, the computing device 900 may be implemented using virtual device(s), and/or across a number of devices (e.g., in a cloud environment).

As illustrated, the computing device 900 includes a CPU 905, memory 910, storage 915, a network interface 925, and one or more I/O interfaces 920. In the illustrated embodiment, the CPU 905 retrieves and executes programming instructions stored in memory 910, as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included to be representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 935 (such as keyboards, monitors, etc.) are connected via the I/O interface(s) 920. Further, via the network interface 925, the computing device 900 can be communicatively coupled with one or more other devices and components (e.g., via a network, which may include the Internet, local network(s), and the like). As illustrated, the CPU 905, memory 910, storage 915, network interface(s) 925, and I/O interface(s) 920 are communicatively coupled by one or more buses 930.

In the illustrated embodiment, the memory 910 includes one or more pre-trained vision-language (VL) vision model(s) 970 (which includes a text encoder 950 and an image encoder 955), one or more embedding aggregation module(s) 975, one or more model training module(s) 960, one or more anomaly detector(s) 965, and one or more text-to-image generator(s) 945.

Although depicted as a discrete component for conceptual clarity, in embodiments, the operations of the depicted component (and others not illustrated) may be combined or distributed across any number of components. Further, although depicted as software residing in memory 910, in embodiments, the operations of the depicted components (and others not illustrated) may be implemented using hardware, software, or a combination of hardware and software.

In one embodiment, the pre-trained vision-language (VL) vision model 970 may transform textual descriptions and images into a shared embedding space, as discussed above. For example, the text encoder 950 within the pre-trained VL vision model 970 may generate text embeddings for each of the textual descriptions for an object. The image encoder 955 within the pre-trained VL vision model 970 may process a known image and/or query image for an object to generate image embeddings for the known image and/or query image.

In one embodiment, the embedding aggregation module 975 may aggregate the embeddings to form a combined vector (e.g., embedding vectors 562 of FIG. 5), as discussed above. For example, in some embodiments, when known normal images of an object and a set of negative texts (including negative words such as "cracked," "defective," "broken," etc.) of the object are applied during training, the embedding aggregation module 975 may concatenate each of the normal image embeddings with each of anomaly text embeddings to generate a longer combined vector that contains information from both the image and text.

In one embodiment, the text-to-image generator 945 may generate synthetic (or artificial) anomaly images of the object based on textual descriptions. As stated above, in some embodiments, the combined vectors generated by concatenating the normal image embeddings and text embeddings (e.g., embedding vectors 562 of FIG. 5) may be processed by the text-to-image generator, to create synthetic images showing defective objects. In some embodiments, the text-to-image generator may comprises a Generative Adversarial Network (GAN) model.

In one embodiment, the training module 960 may provide the generated anomaly images, along with normal images, into a machine learning model (e.g., anomaly detection model 980), and train the model to differentiate between normal and defective objects. The training module 960 may assign appropriate labels to each of the normal images and generated anomaly images. In some embodiments, the training module 960 may divide the labeled dataset into training, validation and testing sets, such that the training set is used to train the model, the validation set is used to tune the model and prevent overfitting, and the testing test is used to evaluate the performance of the model on unseen data.

A number of suitable machine learning algorithms or architectures can be used, depending on the particular implementation. In some embodiments, a binary classifier may be used. In some embodiments, a convolutional neural network architecture may be used for the machine learning model. In some embodiments, a random forest architecture may be used, or any other suitable machine learning algorithm can be used. In some embodiments, different anomaly detection models are trained for different objects. For example, one anomaly detection model may be trained to detect anomalies in images of hazelnuts, another model may be trained detect anomalies in image of apples. Each model is trained using normal and anomalous images of the specific object it is designed to recognize. In some embodiments, the trained anomaly detection models 980 may be saved in storage 915 and be loaded into the anomaly detector 965 at runtime.

In one embodiment, the anomaly detector 965 may load one of trained anomaly detection models 980 and use the selected model to determine whether a query image is normal or anomalous. For example, when a query image is input into the system, the anomaly detector 965 may first identify the object in the query image. Once the object is identified, the anomaly detector 965 may select the corresponding anomaly detection model from the models 980 that are saved in the storage 915. The anomaly detector 965 may use the selected model to analyze the query image and output a prediction indicating whether the object in the query image is normal or defective. In some embodiments, the anomaly detector 965 may generate an anomaly score based on the distances (or similarities) between the query image and normal images, and the distances (or similarities) between the query image and anomaly images. The anomaly detector 965 may compare the anomaly score, as mentioned above, with a pre-defined threshold to determine if the object within the query image is normal or defective.

In the illustrated example, the storage 915 includes textual descriptions 990 (including positive and negative texts) and images 995 (including normal or anomalous images) for different objects, as well as trained anomaly detection models 980, each corresponding to a specific object. Although depicted as residing in storage 915, the textual descriptions 990 and images 995 may be stored in any suitable location, including memory 910.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:

1. A method, comprising:

processing, using a trained model, a plurality of positive text exemplars to generate a set of normal features;

processing, using the trained model, a plurality of negative text exemplars to generate a set of anomaly features;

receiving a query image depicting an object;

generating, using the trained model, a query image feature for the query image; and generating an anomaly score for the query image based at least in part on:

identifying a first nearest neighbor, among the set of normal features, for the query image feature, identifying a second nearest neighbor, among the set of anomaly features, for the query image feature, and generating the anomaly score for the query image based at least in part on distances between the query image feature and each of the first and second nearest neighbors.

2. The method of claim 1, further comprising determining that the query image is anomalous by comparing the anomaly score with a defined threshold.

3. The method of claim 1, further comprising receiving one or more normal images for the object, wherein the set of normal features are generated based at least in part on processing the one or more normal images and the plurality of positive text exemplars using the trained model.

4. The method of claim 1, wherein the trained model comprises a vision-language (VL) model that transforms query images and text exemplars to a unified embedding space.

5. The method of claim 1, wherein the anomaly score for the query image is calculated based on at least one of (i) an angle metric, or (ii) a distance metric.

6. A computer program product comprising one or more computer-readable storage media collectively containing computer-readable program code that, when executed by operation of one or more computer processors, performs an operation comprising:

processing, using a trained model, a plurality of positive text exemplars to generate a set of normal features;

processing, using the trained model, a plurality of negative text exemplars to generate a set of anomaly features;

receiving a query image depicting an object;

generating, using the trained model, a query image feature for the query image; and generating an anomaly score for the query image based at least in part on:

identifying a first nearest neighbor, among the set of normal features, for the query image feature, identifying a second nearest neighbor, among the set of anomaly features, for the query image feature, and generating the anomaly score for the query image based at least in part on distances between the query image feature and each of the first and second nearest neighbors.

7. The computer program product of claim 6, wherein the operation further comprises determining that the query image is anomalous by comparing the anomaly score with a defined threshold.

8. The computer program product of claim 6, wherein the operation further comprises receiving one or more normal images for the object, wherein the set of normal features are generated based at least in part on processing the one or more normal images and the plurality of positive text exemplars using the trained model.

9. The computer program product of claim 6, wherein the trained model comprises a vision-language (VL) model that transforms query images and text exemplars to a unified embedding space.

10. The computer program product of claim 6, wherein the anomaly score for the query image is calculated based on at least one of (i) an angle metric, or (ii) a distance metric.

11. A method, comprising:

processing, using a trained model, a plurality of normal images for an object to generate a set of normal features;

processing, using the trained model, a plurality of negative text exemplars describing the object to generate a set of anomaly features;

generating a plurality of anomaly images for the object based at least in part on the set of normal features and the set of anomaly features; and evaluating a query image using a machine learning (ML) model to output a predicted category of the query image, wherein the ML model is trained using the plurality of normal images and the plurality of anomaly images.

12. The method of claim 11, wherein the trained model comprises a vision-language (VL) model that transforms images and text exemplars to a unified embedding space.

13. The method of claim 11, wherein the predicted category of the query image comprises one of (i) a normal image; or (ii) an anomalous image.

14. The method of claim 11, wherein generating the plurality of anomaly images further comprises:

combining the set of normal features and the set of anomaly features to generate a set of combined vectors; and evaluating the set of combined vectors using a text-to-image model to generate the plurality of anomaly images for the object.

* * * * *